United States Patent
Lu et al.

(10) Patent No.: US 9,455,431 B2
(45) Date of Patent: Sep. 27, 2016

(54) CYANOMETALLATE CATHODE BATTERY AND METHOD FOR FABRICATION

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 339 days.

(21) Appl. No.: 14/174,171

(22) Filed: Feb. 6, 2014

(65) Prior Publication Data
US 2014/0154575 A1 Jun. 5, 2014

Related U.S. Application Data

(63) Continuation of application No. 14/067,038, filed on Oct. 30, 2013, which is a continuation-in-part of application No. 14/059,599, filed on Oct. 22, 2013, now Pat. No. 9,083,041, which is a
(Continued)

(51) Int. Cl.
*H01M 2/00* (2006.01)
*H01M 2/16* (2006.01)
(Continued)

(52) U.S. Cl.
CPC ............ *H01M 2/1686* (2013.01); *C01B 17/02* (2013.01); *C01B 19/02* (2013.01); *C01B 25/003* (2013.01); *C01B 31/00* (2013.01); *C01B 33/021* (2013.01); *C01C 3/12* (2013.01); *C01D 1/02* (2013.01); *C01D 15/02* (2013.01); *H01M 2/1653* (2013.01); *H01M 4/04* (2013.01); *H01M 4/0404* (2013.01);
(Continued)

(58) Field of Classification Search
CPC ............................ H01M 4/5828; H01M 4/04
See application file for complete search history.

(56) References Cited

U.S. PATENT DOCUMENTS

2012/0328936 A1* 12/2012 Wessells ............. H01M 10/054
429/188

FOREIGN PATENT DOCUMENTS

JP 2007-299698 11/2007

OTHER PUBLICATIONS

V. D. Neff, "Some Performance Characteristics of a Prussian Blue Battery", Journal of Electrochemical Society 1985, 132, 1382-1384.
(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski (57) ABSTRACT

A method is provided for fabricating a cyanometallate cathode battery. The method provides a cathode of $A_XM1_YM2_Z(CN)_N \cdot MH_2O$, where "A" is selected from a first group of metals, and where M1 and M2 are transition metals. The method provides an anode and a metal ion-permeable membrane separating the anode from the cathode. A third electrode is also provided including "B" metal ions selected from the first group of metals. Typically, the first group of metals includes alkali and alkaline metals. The method intercalates "B" metal ions from the third electrode to the anode, the cathode, or both the anode and cathode to form a completely fabricated battery. In one aspect, a solid electrolyte interface (SEI) layer including the "B" metal ions overlies a surface of the anode, the cathode, or both the anode and cathode. A cyanometallate cathode battery is also provided.

18 Claims, 5 Drawing Sheets

Related U.S. Application Data continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | |
|---|---|
| H01M 4/58 | (2010.01) |
| C01C 3/12 | (2006.01) |
| H01M 4/136 | (2010.01) |
| H01M 4/04 | (2006.01) |
| H01M 4/62 | (2006.01) |
| H02J 7/00 | (2006.01) |
| H01M 4/134 | (2010.01) |
| H01M 4/1395 | (2010.01) |
| C01B 17/02 | (2006.01) |
| C01B 19/02 | (2006.01) |
| C01B 25/00 | (2006.01) |
| C01B 31/00 | (2006.01) |
| C01B 33/021 | (2006.01) |
| C01D 1/02 | (2006.01) |
| C01D 15/02 | (2006.01) |
| H01M 4/131 | (2010.01) |
| H01M 4/133 | (2010.01) |
| H01M 4/1391 | (2010.01) |
| H01M 4/38 | (2006.01) |
| H01M 4/485 | (2010.01) |
| H01M 4/505 | (2010.01) |
| H01M 4/56 | (2006.01) |
| H01M 4/587 | (2010.01) |
| H01M 10/054 | (2010.01) |
| H01M 10/0525 | (2010.01) |
| H01M 10/0565 | (2010.01) |
| H01M 4/1397 | (2010.01) |
| H01M 10/052 | (2010.01) |

(52) U.S. Cl.
CPC .......... *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

OTHER PUBLICATIONS

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue: a New Framework for Sodium Batteries", Chemistry Communications 2012, 48, 6544-6546.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Power", Nature Communications 2011, 2, Article No. 550.

C. D. Wessells et al., "Nickel Hexacyanoferrate Nanoparticle Electrodes for Aqueous Sodium and Potassium Ion Batteries", Nano Letters 2011, 11, 5421-5425.

C. D. Wessells et al., "The Effect of Insertion Species on Nanostructured Open Framework . . . ", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

M. Hu and J. S. Jiang, "Facile Synthesis of Air-Stable Prussian White Microcubes via a Hydrothermal Method", Materials Research Bulletin 2011, 46, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

\* cited by examiner

Fig. 4

CYANOMETALLATE CATHODE BATTERY AND METHOD FOR FABRICATION

RELATED APPLICATIONS

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a method of fabrication and associated cyanometallate cathode battery with improved capacity.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^+$-ions can "rock" back and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode, in the meantime, electrons pass through an external circuit from the negative electrode to the positive electrode and generate electric power. During a charge, ions and electrons move along the reverse direction and go back to their original places.

Although LIBs have been successfully used, the conflict between lithium demand and its scarcity surges its cost, which hinders the further application of lithium-ion batteries on a large scale. Therefore, a low-cost rechargeable battery is urgently needed as an alternative to expensive LIBs. Under the circumstance, sodium-ion batteries are attracting more attention because sodium has very similar properties to lithium, but a cheaper cost. Like lithium-ion batteries, sodium-ion batteries need $Na^+$-host materials as their electrode. Much effort has been expended to directly duplicate the $Li^+$-host structures, using $Na^+$-host electrode materials for the sodium-ion batteries. For example, $NaCoO_2$, $NaMnO_2$, $NaCrO_2$ and $Na_{0.85}Li_{0.17}Ni_{0.21}Mn_{0.64}O_2$, all having a layered-structure similar to $LiCoO_2$, have been developed for sodium-ion batteries. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$ and $Na_{1.5}VOPO_4F_{0.5}$, have also used as the positive electrode in sodium batteries.

However, it is impractical to copy the structures of $Li^+$-host compounds for $Na^+$ or $K^+$-host compounds. Sodium and potassium ions are much larger than lithium ions, and severely distort the structure of the $Li^+$-host compounds. Thus, it is very important for the advancement of sodium/potassium-ion batteries to develop new $Na^+/K^+$-host materials with large interstitial spaces in which sodium/potassium-ions can easily and reversibly move. $Na^+/K^+$-ions have been observed to intercalate into metal cyanide compounds. Transition metal hexacyanoferrates (TMHCFs) with large interstitial spaces have been investigated as cathode materials for rechargeable lithium-ion batteries [1,2], sodium-ion batteries [3,4], and potassium-ion batteries [5]. With an aqueous electrolyte containing proper alkali-ions or ammonium-ions, copper and nickel hexacyanoferrates [(Cu, Ni)-HCFs] demonstrated robust cycling life with 83% capacity retention after 40,000 cycles at a charge/discharge current of 17C [6-8]. In spite of this, the materials demonstrated low capacities and energy densities because (1) only one sodium-ion can be inserted/extracted into/from per Cu-HCF or Ni-HCF formula, and (2) these TM-HCFs electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

In order to compensate for such shortcomings, manganese hexacyanoferrate (Mn-HCF) and iron hexacyanoferrate (Fe- HCF) have been used as cathode materials in a non-aqueous electrolyte [9, 10]. When assembled with a sodium-metal anode, Mn-HCF and Fe-HCF electrodes cycled between 2.0V and 4.2 V delivered capacities of ~110 mAh/g.

Figure 1:
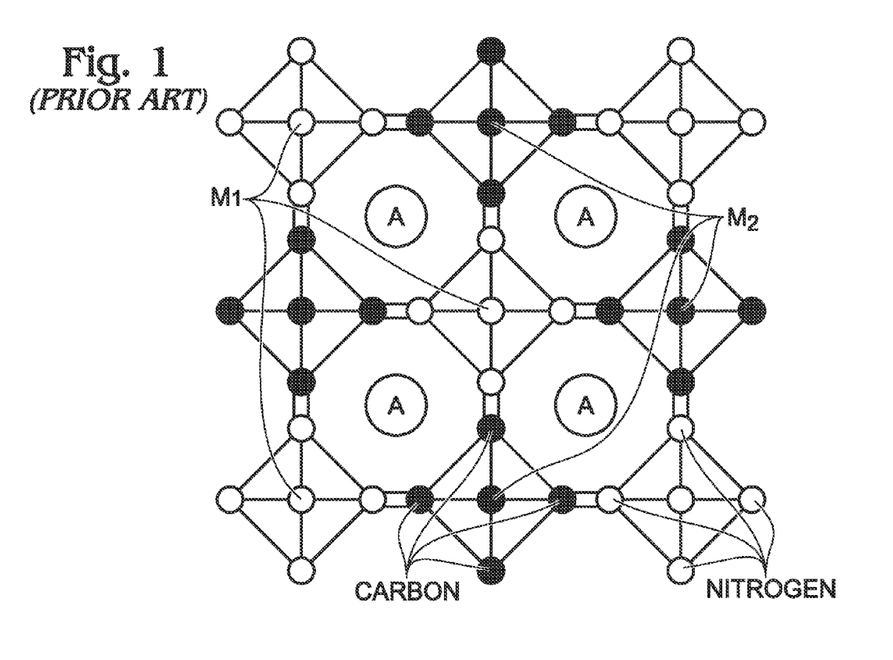
FIG. 1 is a diagram depicting the crystal structure of a metal hexacyanometallate (MHCM) (prior art).

FIG. 1 is a diagram depicting the crystal structure of a metal hexacyanometallate (MHCM) (prior art). The aforementioned TMHCFs can be categorized into a more general group of MHCMs that have the open framework as shown. MHCMs can be expressed as $A_xM1_yM2_z(CN)_N \cdot mH_2O$, where A can be selected from, but not limited to alkali and alkaline metals, and M1 and M2 are transition metals such as titanium (Ti), vanadium (V), chrome (Cr), manganese (Mn), iron (Fe), cobalt (Co), nickel (Ni), copper (Cu), zinc (Zn), calcium (Ca), magnesium (Mg), etc. M1 and M2 can be the same or a different metal. The ratio (x:N) of M1 and M2 is an arbitrary number, depending on the materials used. In addition, various amounts of water ($H_2O$) can occupy in interstitial or lattice positions of MHCMs.

The large interstitial spaces of MHCMs accommodate many kinds of metal ions, which could be used as electrode materials in many kinds of metal-ion batteries. The electrochemical reactions in the batteries can be expressed as follows.

at the cathode:

at the anode:

In MHCM batteries, metal "A" can be simply act as the counter electrode (anode). However, the use of a metal anode inevitably causes dendrite growth during charge/discharge. Metal dendrites may penetrate through the electronic insulators between anode and cathode to short the batteries. As a result, non-metal materials, alloys, and intercalation compounds, indicated as Ø in above electrochemical reactions, have been developed to replace metal electrodes. In lithium-ion batteries for example, graphite has been used as a substitute for a lithium-metal anode.

To obtain high voltages with MHCM batteries, the anode electrodes are expected to have a low potential around which the electrolyte may be reduced. Meanwhile, passivating layers, nominally solid electrolyte interface (SEI) layers, form on the anode materials to prevent further electrolyte reactions. Simultaneously intercalating metal ions from cathode are exhausted irreversibly. If these ions cannot be replenished when non-intercalating ion loaded anode electrodes are used, the batteries demonstrate low energy densities.

The use of non-intercalating ion loaded anode electrodes presents another problem. If the intercalating ions are not primarily stored in the cathode, then it is impossible to assemble battery with the cathode and non-intercalating ion loaded anode. For example, capacity problems exist for a battery with a Berlin green ($Fe_2(CN)_6$) cathode and a hard carbon (HC) anode, even though Berlin green has been proved to be a useful cathode material in batteries.

It would be advantageous if cyanometallate cathode batteries could be fabricated in a manner that could activate the anode electrodes and form SEI layers, without exhausting intercalating ions from cathode or anode, in order to safely improve battery energy densities.

[1] V. D. Neff, "Some Performance Characteristics of a Prussian Blue Battery", *Journal of Electrochemical Society* 1985, 132, 1382-1384.

[2] N. Imanishi, T. Morikawa, J. Kondo, Y. Takeda, O. Yamamoto, N. Kinugasa, and T. Yamagishi, "Lithium Intercalation Behavior into Iron Cyanide Complex as Positive Electrode of Lithium Secondary Battery", *Journal of Power Sources* 1999, 79, 215-219.

[3] Y. Lu, L. Wang, J. Cheng, and J. B. Goodenough, "Prussian Blue: a New Framework for Sodium Batteries", *Chemistry Communications* 2012, 48, 6544-6546.

[4] L. Wang, Y. Lu, J. Liu, M. Xu, J. Cheng, D. Zhang, and J. B. Goodenough, "A Superior Low-Cost Cathode for a Na-ion Battery", *Angewandte Chemie International Edition* 2013, 52, 1964-1967.

[5] A. Eftekhari, "Potassium Secondary Cell Based on Prussian Blue Cathode", *Journal of Power Sources* 2004, 126, 221-228.

[6] C. D. Wessells, R. A. Huggins, and Y. Cui, "Copper Hexacyanoferrate Battery Electrodes with Long Cycle Life and High Power", *Nature Communications* 2011, 2, Article number: 550.

[7] C. D. Wessells, S. V. Peddada, R. A. Huggins, and Y. Cui, "Nickel Hexacyanoferrate Nanoparticle Electrodes for Aqueous Sodium and Potassium Ion Batteries", *Nano Letters* 2011, 11, 5421-5425.

[8] C. D. Wessells, S. V. Peddada, M. T. McDowell, R. A. Huggins, and Y. Cui, "The Effect of Insertion Species on Nanostructured Open Framework Hexacyanoferrate Battery Electrodes", *Journal of the Electrochemical Society* 2012, 159, A98-A103.

[9] T. Matsuda, M. Takachi, and Y. Moritomo, "A Sodium Manganese Ferrocyanide Thin Film for Na-ion Batteries", *Chemical Communications* 2013, 49, 2750-2752.

[10] S-H. Yu, M. Shokouhimehr, T. Hyeon, and Y-E. Sung, "Iron Hexacyanoferrate Nanoparticles as Cathode Materials for Lithium and Sodium Rechargeable Batteries", *ECS Electrochemistry Letters* 2013, 2, A39-A41.

SUMMARY OF THE INVENTION

Disclosed herein is process for preparing cyanometallate cathode batteries. The process activates the anode and cathode electrodes and forms SEI layers, but does not exhaust the intercalating ions, which insures a batteries safely working with high energy densities. The materials for the positive electrode (cathode) may be expressed as $A_xM1_yM2_z(CN)_N \cdot mH_2O$. "A" is a metal ion that can be, but is not limited to alkali and alkaline metal ions. M1 and M2 are the same or different metal ions selected from a group of titanium (Ti), vanadium (V), chrome (Cr), manganese (Mn), iron (Fe), cobalt (Co), nickel (Ni), copper (Cu), zinc (Zn), calcium (Ca), magnesium (Mg), etc. A third electrode typically containing alkali or alkaline ("B") metal ions is introduced to the batteries during assembling. The batteries may be cycled several times under different modes to load "B" metal ions into the cathode and/or anode. Simultaneously, depending of the specific type of anode and cathode materials, SEI layers may form on the anode and/or cathode electrodes. Since metal anodes are not required, the process typically forms little or no metal dendrites. The third electrode with residual "B" metal ions may be kept in or removed from the final battery product.

Accordingly, a method is provided for fabricating a cyanometallate cathode battery. The method provides a cathode of $A_X M1_Y M2_Z(CN)_N \cdot MH_2O$:
- where "A" is selected from a first group of metals,
- where M1 and M2 are transition metals,
- where X is less than or equal to 2,
- where Y is less than or equal to 1,
- where Z is less than or equal to 1,
- where N is less than or equal to 6, and
- where M is less than or equal to 20.

The method provides an anode and a metal ion-permeable membrane separating the anode from the cathode. A third electrode is also provided including "B" metal ions selected from the first group of metals. Typically, the first group of metals includes alkali and alkaline metals. The method intercalates "B" metal ions from the third electrode to the anode, the cathode, or both the anode and cathode to form a completely fabricated battery. In one aspect, a SEI layer including the "B" metal ions overlies a surface of the anode, the cathode, or both the anode and cathode.

Subsequent to forming the completely fabricated battery, the battery may be discharged in response to creating a battery external voltage potential between the cathode and the anode, which form a cathode of $B_D A_X M1_Y M2_Z(CN)_N \cdot MH_2O$;
- where D>0; and,
- where X' is less than or equal to X.

Alternatively, the battery may be charged in response to creating a battery external voltage potential between the anode and the cathode, forming an anode that includes intercalating "B" metal ions.

More particularly, in one aspect during fabrication, the method immerses the third electrode and the anode in an electrolyte and creates a battery external voltage potential between the anode and the third electrode. In this manner, the method intercalates "B" metal ions from the third electrode to the anode. Alternatively, the method immerses the third electrode and the cathode in an electrolyte, creating a battery external voltage potential between the cathode and the third electrode. As a result, the method intercalates "B" metal ions from the third electrode into the cathode.

A cyanometallate cathode battery is also provided, made from an electrolyte and a cathode of $A_X M1_Y M2_Z(CN)_N \cdot MH_2O$, as expressed in the battery charged state. As above:
- "A" is selected from a first group of metals;
- M1 and M2 are transition metals;
- X' is less than or equal to 2;
- Y is less than or equal to 1;
- Z is less than or equal to 1;
- N is less than or equal to 6; and,
- M is less than or equal to 20.

The anode includes "B" metal ions, selected from the first group of metals, in the battery charged state. In the battery discharged state, the cathode is $B_D A_X M1_Y M2_Z(CN)_N \cdot MH_2O$, where D>0.

Additional details of the above-described method and battery are presented below.

DETAILED DESCRIPTION

Figure 2A:
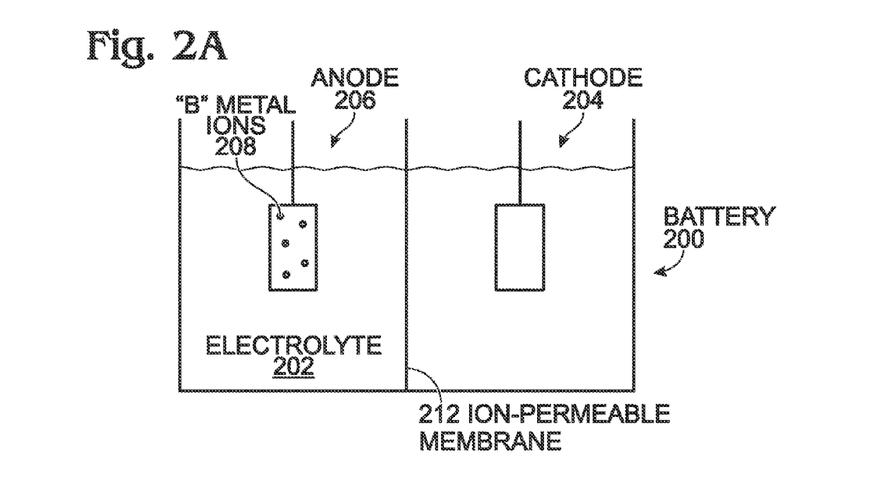
FIGS. 2A through 2F are partial cross-sectional views of a cyanometallate cathode battery.

FIGS. 2A through 2F are partial cross-sectional views of a cyanometallate cathode battery. The battery 200 comprises an electrolyte 202 and a cathode 204. In the battery charged state the cathode 204 can be expressed as:

where "A" is selected from a first group of metals;
where M1 and M2 are transition metals;
where X' is less than or equal to 2;
where Y is less than or equal to 1;
where Z is less than or equal to 1;
where N is less than or equal to 6; and
where M is less than or equal to 20.

In the battery charged state, an anode 206 includes "B" metal ions 208, selected from the first group of metals. A metal ion-permeable membrane 212 separates the anode 206 from the cathode 204.

The first group of metals includes alkali metals, alkaline earth metals, or combinations thereof. More explicitly, the first group of metals may be comprised of lithium (Li), sodium (Na), potassium (K), rubidium (Rb), cesium (Cs), calcium (Ca), magnesium (Mg), or combinations thereof. M1 and M2 are each independently derived—they can be the same or a different transition metal, and are typically one of the following: titanium (Ti), vanadium (V), chromium (Cr), manganese (Mn), iron (Fe), cobalt (Co), nickel (Ni), copper (Cu), zinc (Zn), Ca, and Mg. The anode 206 may be made of carbon (C), silicon (Si), antimony (Sb), lead (Pb), tin (Sn), or phosphorus (P), for example.

Figure 2B:
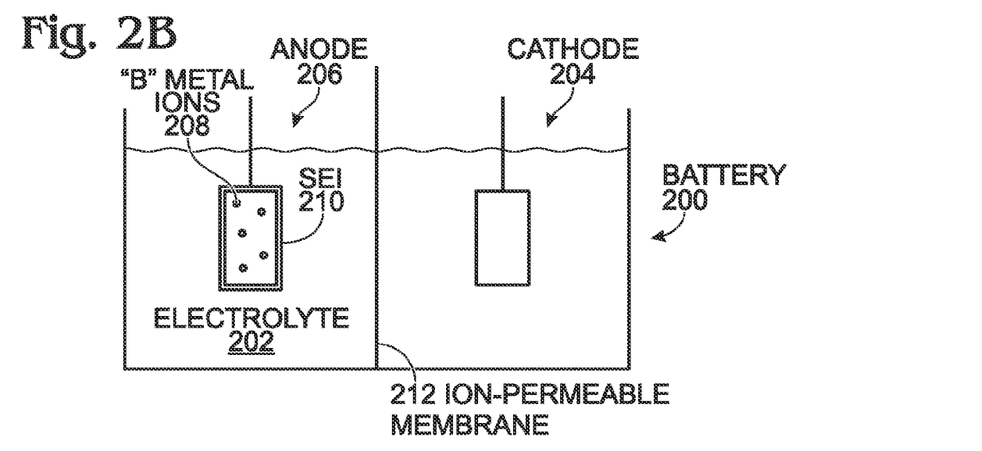
Figure 2C:
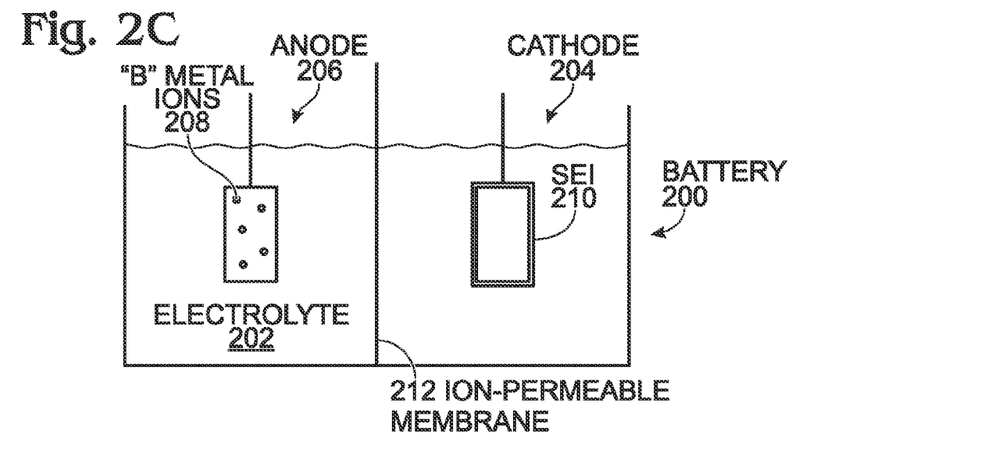
Figure 2D:
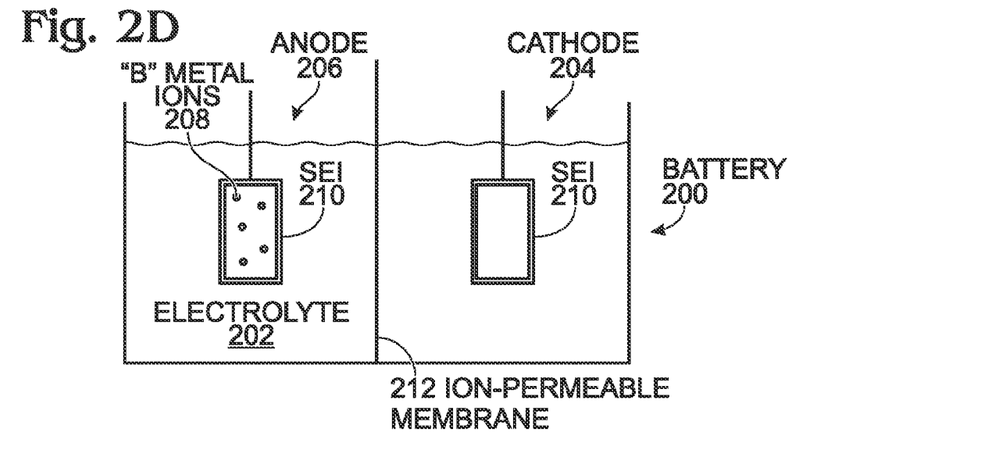

In some aspects, the battery 200 may further comprise a solid electrolyte interface (SEI) layer 210 including the "B" metal ions 208 overlying a surface of the anode, as shown in FIG. 2B, the surface of the cathode (FIG. 2C), or the surfaces of both the anode and cathode (FIG. 2D).

Figure 2E:
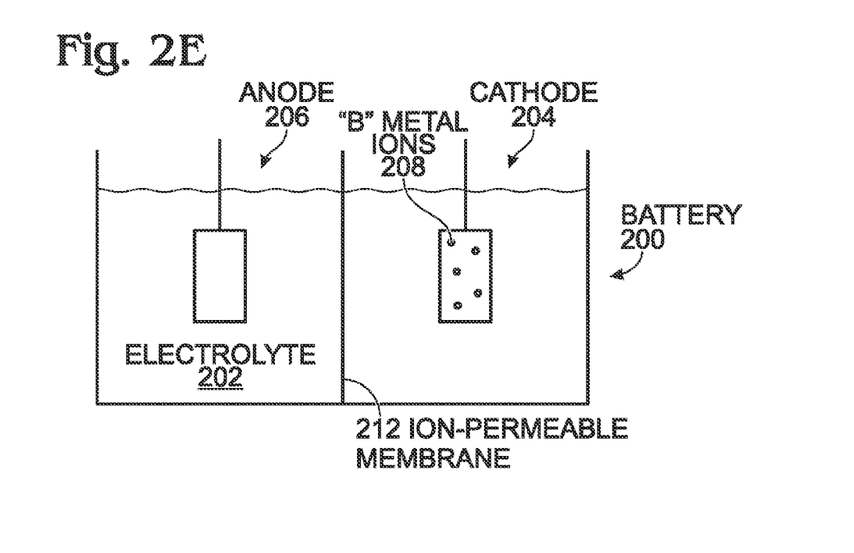

In the battery discharged state, as depicted in 2E, the cathode 204 can be expressed as:

In other words, in the process of discharging the battery (i.e. connected the cathode and anode to an external load), "B" metal ions 208 from the anode intercalate from the anode 206 to the cathode 204.

Although not explicitly shown in FIG. 2E (in the interest of brevity), SEI layers may be formed on the anode, cathode, or both the anode and cathode when the battery is in the discharged state. It should be understood that if SEI layers have been formed during battery fabrication, they are maintained regardless of the charge/discharge state of the battery. Also not shown, a polymeric binder such as polytetrafluoroethylene (PTFE) or polyvinylidene difluoride (PVDF) may be used to provide adhesion between electrode materials and current collectors to improve the overall physical stability.

The electrolyte 202 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene)oxide (PEO) and fluorinated polymers such as poly(vinylidene) fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. In some instances not shown, the ion-permeable membrane 212 and the electrolyte 202 can be the same material, as may be the case for polymer gel, polymer, and solid electrolytes.

Figure 2F:
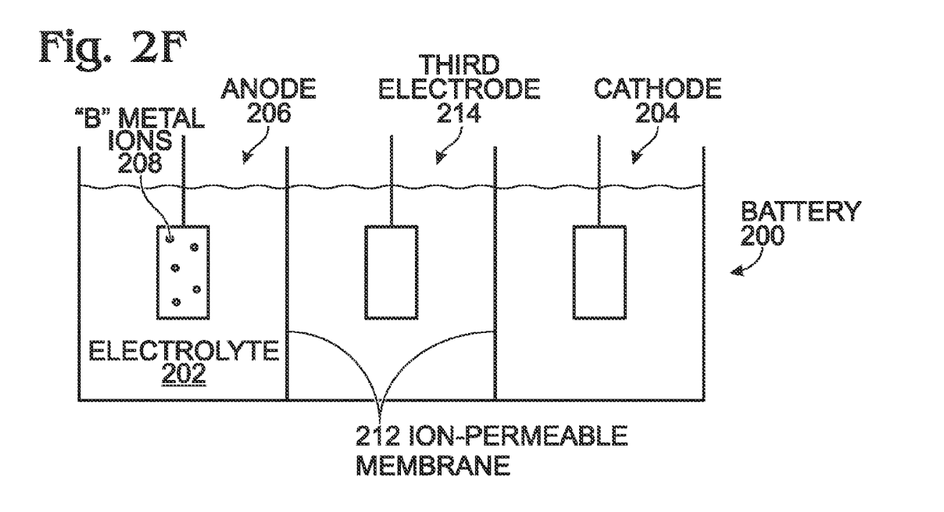

FIG. 2F is a partial cross-sectional view of a charged cyanometallate cathode battery including a third electrode. As described in more detail below, the batteries depicted in FIGS. 2A-2E are fabricated with the use of a third electrode comprising "B" metal ions. After fabrication, the third electrode may be removed from the battery, as shown in FIGS. 2A-2E. Alternatively, as shown in FIG. 2F, the third electrode 214 may be left in place. Further, the third electrode 214 can be left in place regardless of the battery charge condition. Although the third electrode is shown as separated from the anode 206 and cathode 204 by an ion-permeable membranes 212, alternatively, is some aspects the third electrode may be located on the same side of the ion-permeable membrane as the anode or cathode. In another aspect not shown, the electrodes and ion-permeable membranes are arranged so that each electrode is separated from each other electrode by a single ion-permeable membrane. Although not shown, the anode, the cathode, or both the anode and cathode may have REI layers, depending upon the materials used.

Figure 3:
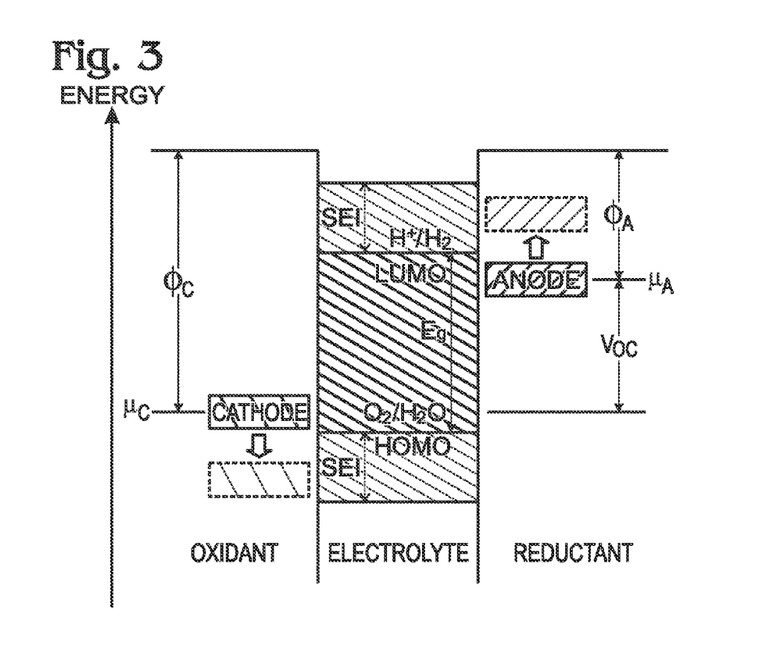
FIG. 3 is a schematic diagram depicting conditions required for the formation of REI layers (prior art).

FIG. 3 is a schematic diagram depicting conditions required for the formation of REI layers (prior art). The cathode has an electrochemical potential of $\mu_C$ and the anode has an electrochemical potential of $\mu_A$. An anode with a $\mu_A$ above the lowest occupied molecular orbit (LUMO) reduces an electrolyte, while a cathode with a $\mu_C$ below LUMO oxidizes the electrolyte. If the $\mu_C$ of a particular cathode material is less that LUMO, kinetic stability requires the formation of an SEI layer at the cathode. Likewise, if the $\mu_A$ of a particular anode material is greater than LUMO, an SEI layer forms on the anode surface.

The battery cathode material, $A_XM1_YM2_Z(CN)_N \cdot MH_2O$, has a framework with larger interstitial spaces that consists of a M1-N-C-M2 skeleton and large interstitial space as shown in FIG. 1. Once fabricated, "B" metal ions can easily and reversibly move in the interstitial spaces of the cathode. The anode materials can be one of carbonaceous materials, oxides, sulfides, nitrides, phosphorus, or alloys, etc. In order to obtain high voltages for batteries, a non-aqueous electrolyte, such as an organic electrolyte, gel electrolyte, polymer electrolyte, solid electrolyte, etc., is used in the batteries.

The theoretical capacities of the batteries can be calculated by the amount of metal ions in the cathodes. Conventionally, the theoretical capacities of such batteries are larger than their testing results because many of the metal ions are irreversibly exhausted in the formation of SEI layers. In addition, when the interstitial positions of the cathode are not occupied, or only partially occupied with "A" metal ions, it is not practicable to assemble a battery with such a cathode and non-"A" metal ion-loaded anode because the battery capacity is too low to store energy. For example, no metal ions are present for intercalation in a battery made with a Berlin green ($Fe_2(CN)_6$) cathode and a hard carbon anode, so its capacity is almost zero.

To solve these problems, the battery described in FIGS. 2A-2F is fabricated using a third electrode. The third electrode includes materials containing "B" metal ions, selected from the same kinds of metals as the "A" metal ions, although the "A" and "B" metals need not necessarily be the same. The main mechanism of the process is that the third electrode can act as a "B" metal ion reservoir to provide irreversible "B" metal ions for SEI layer formation, and/or reversible "B" metal ions for intercalation between the anode and cathode during charging and discharging.

There are many routes to realize the process. The simplest one is to cycle the anode and the third electrode until the anode reaches stability, and then adjust the amount of "B" metal ions in the battery to obtain an optimal capacity. In other routes, all three electrodes all are used to perform the process. The "B" metal ions can be transferred from the third electrode to cathode via anode, or to anode via cathode. After the process is finished, the third electrode with residual "B" containing materials can be kept in or removed from the battery.

For example, a battery may begin the fabrication process with a Berlin green (BG, $Fe_2(CN)_6$) cathode and hard carbon (HC) anode. Noteworthy is the fact that no ions are available in either electrode, so this type of device cannot store energy. In order to obtain a workable sodium-ion battery with these electrodes, a third electrode with sodium metal is introduced. One way to form the battery is to simply connect the hard carbon electrode and sodium metal electrode to a battery tester to create a voltage potential, and cycle these two electrodes by alternating the polarity of voltage potential, to insert Na-ion into the hard carbon anode and to form SEI layers on the hard carbon anode surfaces. After the hard carbon electrode reaches fully sodiated condition, the sodium electrode is disconnected. The sodiated hard carbon electrode and the Berlin green electrode become, respectively, the anode and cathode of a sodium ion battery.

In another variation of the process, the sodium-metal (third) electrode and the BG electrode are connected through a battery tester. By alternating the polarity of voltage potential, the sodium-ions are intercalated into the BG interstitial spaces. Then, the sodiated BG electrode and the HC electrode are connected through the battery tester and cycled to form SEI layers and stabilize the electrodes. During cycling, the HC electrode or the BG electrode can be connected with the sodium electrode to replenish the $Na^+$-ions exhausted in irreversible reactions, for example, SEI formation. After the process, the sodium electrode is disconnected, and the hard carbon electrode and BG electrode become, respectively, the anode and cathode of a sodium ion battery. The sodium ions are stored in either the HC anode or BG cathode after this battery forming process.

A third method to form the BG-HC battery uses only two external electrodes. The sodium metal is directly connected to the HC electrode. In one case, the sodium-metal is in immediate contact to the HC material. The battery forming process is following:

(1) Discharge the battery. The sodium metal produces the sodium-ions at the anode side, and ions go through the electrolyte and intercalate into BG cathode.

(2) Charge the battery. The sodium-ions are dc-intercalated from BG electrode, and move to the anode side. The anode consists of hard carbon and the sodium metal, and since the potential for the reactions between sodium-ions and hard carbon is higher than that for the sodium deposition on sodium metal, the sodium-ions prefer to react with hard carbon.

(3) Repeat the above two steps several times, and the formation process is then completed.

Figure 4:
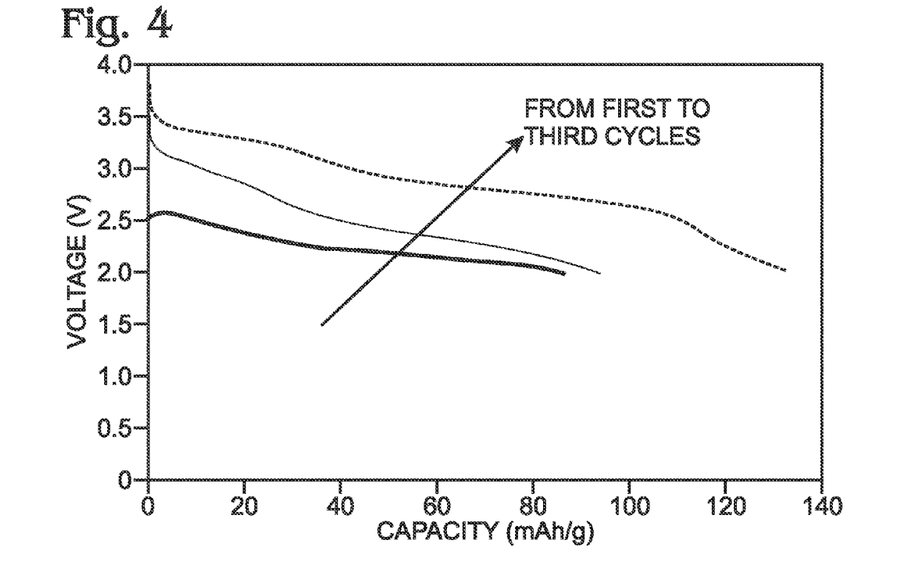
FIG. 4 is a graph depicting battery discharge curves.

FIG. 4 is a graph depicting battery discharge curves. Experimental results of the above-described third method show that the cycling produces a higher battery voltage and larger battery capacity. Initially, the "battery" i.e. the pre-fabricated battery) with a sodium electrode directly in contact with a hard carbon electrode shows an open circuit voltage (OCV) of 2.54 V. It is worth noting that the OCV for a battery with BG cathode and sodium anode is ~3.50 V. So the presence of the sodium metal at electrode causes a mixed voltage for the BG-HC battery. The voltage between the BG cathode and the HC anode is ~1 V. When the anode consists of hard carbon and sodium metal, a battery with a BG cathode presents a voltage of 2.54V, which is not equal to the voltage of either a pure HC anode or a pure sodium metal anode. Under this circumstance, the voltage can be attributed to the mixture of HC and sodium metal anode. Accordingly, the voltage can be called as the mixed voltage.

In this case, the BG cathode limits the battery capacity, so the capacity density shown here is calculated based upon the BG mass. Due to the low OCV, the battery delivered a capacity of only ~86 milliamp-hours per gram (mAh/g) during the first discharge. With continuously cycling, the battery OCV voltage becomes higher and battery capacity becomes larger because more sodium-ions are inserted into hard carbon anode electrode. After the third cycle, the BG-HC battery reaches a stable condition and demonstrates a capacity of 132 mAh/g.

The type of battery depends on the "third" electrode rather than the ion, "A", in the cathode. For example, a battery may have a cathode of $K_{0.1}FeMn(CN)_6$ and an anode of hard carbon. Sodium metal is used as the third electrode to process the cathode or anode. After taking away the third electrode, the discharged battery finally consists of a cathode of $Na_yK_{0.1-x}FeMn(CN)_6$ and the hard carbon anode. As a result, the type of the battery is sodium-ion ("B" metal ions from the third electrode) battery rather than potassium-ion ("A" metal ions from the initial cathode) battery. Like M1 and M2 in the cathode, "A" is just an element to constitute the cathode molecule. It is not necessary that the third electrode "B" must be the same as "A".

During fabrication, it is possible that the "A" metal ions in the initial cathode stay in the cathode or move out from the cathode. Of greater importance is the fact that the third electrode with the "B" metal ions introduces many more ions to the battery and increases its capacity. For example, a battery may consist of a $K_{0.1}FeMn(CN)_6$ ("A"=K) cathode and a hard carbon anode. If there is no third electrode to process the anode or cathode, the battery capacity is determined by the potassium content in the cathode (that is 0.1K in $K_{0.1}FeMn(CN)_6$). After introducing a third electrode of Na metal ("B"=Na), 1.9 Na is introduced to the cathode and forms $Na_{1.9}K_{0.1}FeMn(CN)_6$, if there are no defects and water in the material. The introduction of reversible Na-ions significantly improves the cathode capacity. Of course, the third electrode can be potassium (B=K). In that case, "A" equals "B".

Thus, the "B" metal ions are important for energy storage and conversion. The discharged anode can be said to act as a "B" metal ion host from which "B" metals ions can be reversibly intercalated. Alternatively, the charged cathode can be considered as the "B" metal ion host. Initially, the anode may include some "B" compounds, but these "B" metal ions are not released from these compounds for intercalation or SEI formation.

As another example, the initial pre-fabrication cathode may be $AlxMnFe(CN)_6$. Al is a trivalent ion that has a very strong interaction with Mn and Fe, and cannot be deintercalated from the cathode. Al, Mn, and M2 constitute the cathode material. During the forming process, sodium-ion can be intercalated into the cathode or anode. Al-ions do not intercalate or deintercalate during the process, even if $Al_2O_3$ is initially included in the anode.

The battery capacity is determined by how many ions can be intercalated/deintercalated between cathode and anode reversibly. To quantify the increase of intercalating ions in the battery, a $B_DA_XM1_YM2_Z(CN)_N \cdot m'H_2O$ cathode is defined (D>0) that can be achieved during the discharge of a completely fabricated battery in which the third electrode has been removed. If "B"="A", the cathode is $A_{X'}M1_YM2_Z(CN)_N \cdot m''H_2O$ (x">x') during discharge. For example, a pre-fabricated battery may have a $Al_{0.1}MnFe(CN)_6$ cathode and a hard carbon anode. After forming with a third electrode of sodium metal and removing it from the battery, $Na_DAl_{0.1}MnFe(CN)_6$ (D>0) can be achieved if Na is stored in the cathode. D>0 means that more reversible Na-ions are stored in the battery and its capacity is increased. If Na is stored in the hard carbon anode, once the battery is discharged, $Na_{D'}Al_{0.1}MnFe(CN)_6$ is obtained and D'>0, which shows an increase in the battery's capacity.

Figure 5:
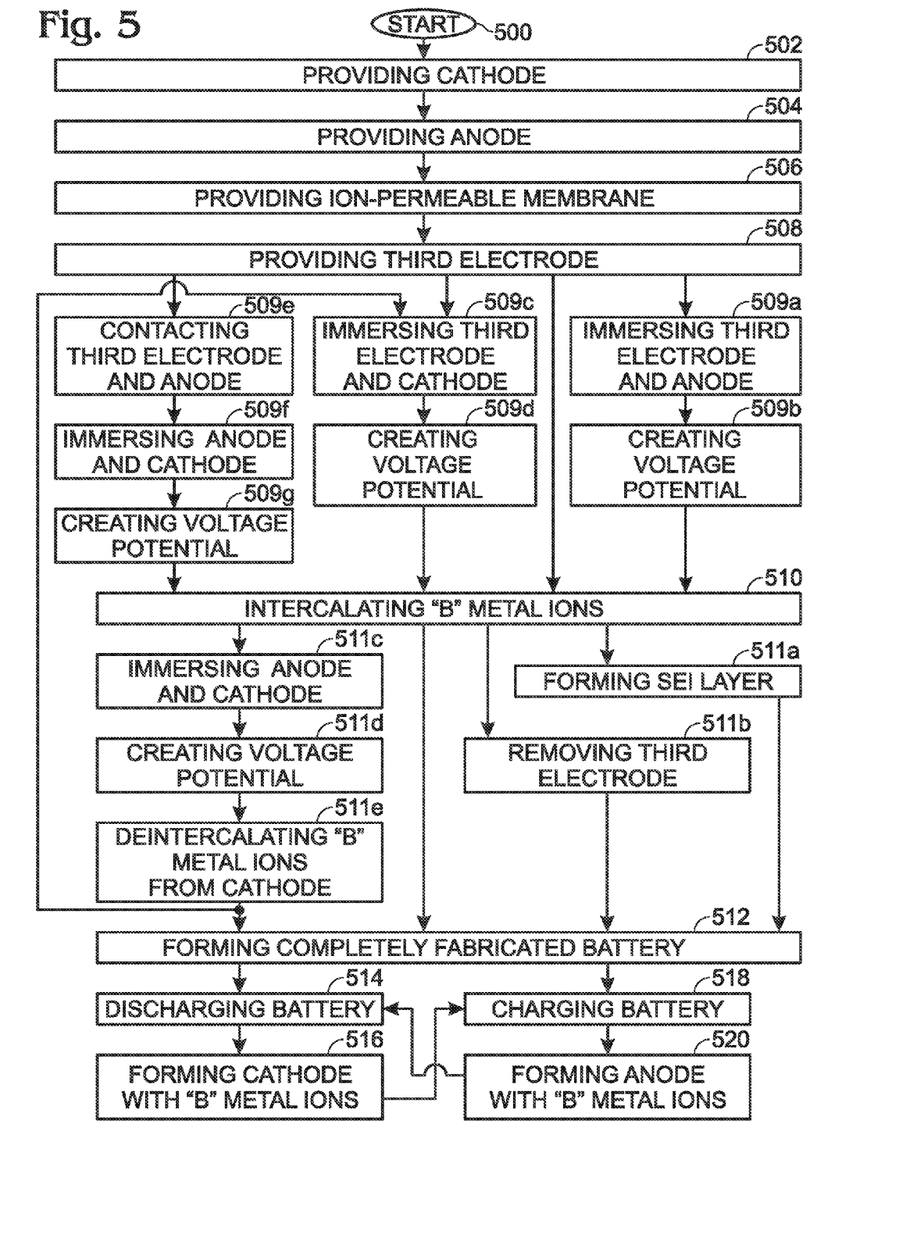
FIG. 5 is a flowchart illustrating a method for fabricating a cyanometallate cathode battery.

FIG. 5 is a flowchart illustrating a method for fabricating a cyanometallate cathode battery. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 provides a cathode of $A_XM1_YM2_Z(CN)_N \cdot MH_2O$;
where "A" is selected from a first group of metals;
where M1 and M2 are transition metals;
where x is less than or equal to 2;
where y is less than or equal to 1;
where z is less than or equal to 1;
where n is less than or equal to 6; and,
where m is less than or equal to 20.

The first group of metals comprises alkali metals, alkaline earth metals, and combinations thereof. Some specific examples of metals from the first group include lithium (Li), sodium (Na), potassium (K), rubidium (Rb), cesium (Cs), calcium (Ca), and magnesium (Mg). M1 and M2 are each independently derived (may be the same or different), and may be transition metals such as titanium (Ti), vanadium (V), chromium (Cr), manganese (Mn), iron (Fe), cobalt (Co), nickel (Ni), copper (Cu), zinc (Zn), Ca, or Mg.

Step 504 provides an anode. The anode may include materials such as carbon (C), silicon (Si), antimony (Sb), lead (Pb), tin (Sn), phosphorus (P), or combinations of the above-mentioned materials.

Step 506 proves a metal ion-permeable membrane separating the anode from the cathode. Step 508 provides a third electrode including "B" metal ions selected from the first group of metals. Step 510 intercalates "B" metal ions from the third electrode to the anode, the cathode, or both the anode and cathode. Step 512 forms a completely fabricated battery. In one aspect, Step 511*a* forms a SEI layer including the "B" metal ions overlying a surface of the anode, the cathode, or both the anode and cathode. In another aspect subsequent to intercalating "B" metal ions from the third electrode to the selected electrode in Step 510, Step 511b removes the third electrode.

Subsequent to forming the completely fabricated battery in Step 512, Step 514 discharges the battery in response to creating a battery external voltage potential between the cathode and the anode. Note: the battery may need to be charged upon the completion of Step 512 and prior to Step 514, depending upon the fabrication process used, by creating a voltage potential between the anode and cathode using a voltage source external to the battery. Step 516 forms a cathode of $B_D A_{X'} M1_Y M2_Z(CN)_N \cdot MH_2O$;
where D>0; and,
where x' is less than or equal to x.

In another aspect subsequent to forming the completely fabricated battery in Step 512, Step 518 charges the battery in response to creating a battery external voltage potential between the anode and the cathode. Note: the battery may need to be discharged upon the completion of Step 512 and prior to Step 518, depending upon the fabrication process used, by creating a voltage potential between the cathode and anode using a voltage source external to the battery. Step 520 forms an anode including intercalating "B" metal ions.

In one aspect, Step 509a immerses the third electrode and the anode in an electrolyte. Step 509b creates a battery external voltage potential between the anode and the third electrode. Then, Step 510 intercalates "B" metal ions from the third electrode into the anode.

In another aspect, Step 509c immerses the third electrode and the cathode in an electrolyte. Step 509d creates a battery external voltage potential between the cathode and the third electrode. Then, Step 510 intercalates "B" metal ions from the third electrode into the cathode. The method may be continued in Step 511c by immersing the anode and cathode in the electrolyte. Step 511d creates a battery external voltage potential between the cathode and the anode. Step 511e deintercalates "B" metal ions from the cathode and intercalates the "B" metal ions into the anode. Steps 509c through 511e may be iterated several times to incorporate the desired number of "B" metal ions into the battery.

In another variation, Step 509e forms an immediate, low resistance contact between the anode and the third electrode. Step 509f immerses the anode and cathode in an electrolyte. Step 509g creates a battery external voltage potential between the cathode and the anode. Then, Step 510 intercalates "B" metal ions from the third electrode by intercalating "B" metal ions from the anode into the cathode.

A cyanometallate cathode battery and associated fabrication processes have been provided. Examples of particular materials and process steps have been presented to illustrate the invention. However, the invention is not limited to merely these examples. Other variations and embodiments of the invention will occur to those skilled in the art.

We claim:
1. A method for fabricating a cyanometallate cathode battery, the method comprising:
   providing a cathode of $A_X M1_Y M2_Z(CN)_N \cdot MH_2O$;
     where "A" is selected from a first group of metals;
     where M1 and M2 are selected from a second group of metals including transition metals;
     where X is less than or equal to 2;
     where Y is less than or equal to 1;
     where Z is less than or equal to 1;
     where N is less than or equal to 6;
     where M is less than or equal to 20;
   providing an anode;
   proving a metal ion-permeable membrane separating the anode from the cathode;
   providing a third electrode including "B" metal ions selected from the first group of metals;
   intercalating "B" metal ions from the third electrode to an electrode selected from a group consisting of the anode, the cathode, and both the anode and cathode;
   forming a completely fabricated battery;
   subsequent to forming the completely fabricated battery, discharging the battery in response to creating a battery external voltage potential between the cathode and the anode; and,
   forming a cathode of $B_D A_{X'} M1_Y M2_Z(CN)_N \cdot MH_2O$;
     where D>0; and,
     where x' is less than or equal to x.

2. The method of claim 1 further comprising:
   forming a solid electrolyte interface (SEI) layer including the "B" metal ions overlying a surface selected from a group consisting of the anode, the cathode, and both the anode and cathode.

3. The method of claim 1 further comprising:
   subsequent to forming the completely fabricated battery, charging the battery in response to creating a battery external voltage potential between the anode and the cathode; and,
   forming an anode including intercalated "B" metal ions.

4. The method of claim 1 wherein where the first group of metals is selected from a group consisting of alkali metals, alkaline earth metals, and combinations thereof.

5. The method of claim 4 wherein the first group of metals is selected from the group of metals consisting of lithium (Li), sodium (Na), potassium (K), rubidium (Rb), cesium (Cs), calcium (Ca), and magnesium (Mg).

6. The method of claim 1 wherein M1 and M2 are each independently derived, as selected from the group consisting of titanium (Ti), vanadium (V), chromium (Cr), manganese (Mn), iron (Fe), cobalt (Co), nickel (Ni), copper (Cu), zinc (Zn), Ca, and Mg.

7. The method of claim 1 further comprising:
   subsequent to intercalating "B" metal ions from the third electrode to the selected electrode, removing the third electrode.

8. The method of claim 1 further comprising:
   immersing the third electrode and the anode in an electrolyte; and,
   creating a battery external voltage potential between the anode and the third electrode; and,
   wherein intercalating "B" metal ions from the third electrode to the selected electrode includes intercalating "B" metal ions into the anode.

9. The method of claim 1 further comprising:
   immersing the third electrode and the cathode in an electrolyte;
   creating a battery external voltage potential between the cathode and the third electrode;
   wherein intercalating "B" metal ions from the third electrode to the selected electrode includes intercalating "B" metal ions into the cathode.

10. The method of claim 1 further comprising:
    immersing the third electrode and the cathode in an electrolyte;
    creating a battery external voltage potential between the cathode and the third electrode;
    wherein intercalating "B" metal ions from the third electrode to the selected electrode includes intercalating "B" metal ions into the cathode;

immersing the anode and cathode in an electrolyte;
creating a battery external voltage potential between the anode and the cathode; and,
deintercalating "B" metal ions from the cathode and intercalating the "B" metal ions into the anode.

11. The method of claim 1 further comprising:
forming an immediate, low resistance contact between the anode and the third electrode;
immersing the anode and cathode in an electrolyte;
creating a battery external voltage potential between the cathode and the anode; and,
wherein intercalating "B" metal ions from the third electrode to the selected electrode includes intercalating "B" metal ions from the anode into the cathode.

12. The method of claim 1 wherein providing the anode includes providing an anode made from a material selected from the group consisting of carbon (C), silicon (Si), antimony (Sb), lead (Pb), tin (Sn), and phosphorus (P).

13. A cyanometallate cathode battery, the battery comprising:
an electrolyte;
a cathode of $A_X M1_Y M2_Z(CN)_N \cdot MH_2O$ in a battery charged state;
where "A" is selected from a first group of metals;
where M1 and M2 are selected from a second group of metals including transition metals;
where $X$ is less than or equal to 2;
where $Y$ is less than or equal to 1;
where $Z$ is less than or equal to 1;
where $N$ is less than or equal to 6;
where $M$ is less than or equal to 20;
an anode including "B" metal ions, selected from the first group of metals, in the battery charged state;
a metal ion-permeable membrane separating the anode from the cathode; and,
wherein the cathode is $B_D A_X M1_Y M2_Z(CN)_N \cdot MH_2O$ in a battery discharged state, where $D>0$.

14. The battery of claim 13 wherein where the first group of metals is selected from the group consisting of alkali metals, alkaline earth metals, and combinations thereof.

15. The battery of claim 14 wherein the first group of metals is selected from the group of metals consisting of lithium (Li), sodium (Na), potassium (K), rubidium (Rb), cesium (Cs), calcium (Ca), and magnesium (Mg).

16. The battery of claim 13 wherein M1 and M2 are each independently derived, as selected from the group consisting of titanium (Ti), vanadium (V), chromium (Cr), manganese (Mn), iron (Fe), cobalt (Co), nickel (Ni), copper (Cu), zinc (Zn), Ca, and Mg.

17. The battery of claim 13 further comprising:
a solid electrolyte interface (SEI) layer including the "B" metal ions overlying a surface selected from a group consisting of the anode, the cathode, and both the anode and cathode.

18. The battery of claim 13 wherein the anode includes a material selected from the group consisting of carbon (C), silicon (Si), antimony (Sb), lead (Pb), tin (Sn), and phosphorus (P).

* * * * *